US012673685B2

(12) United States Patent
Lee et al.

(10) Patent No.: US 12,673,685 B2
(45) Date of Patent: Jul. 7, 2026

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Seonghun Lee, Tokyo (JP); Ryo Morosawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 18/443,927

(22) Filed: Feb. 16, 2024

(65) Prior Publication Data

US 2024/0294175 A1     Sep. 5, 2024

(30) Foreign Application Priority Data

Mar. 3, 2023     (JP) ................................. 2023-032488

(51) Int. Cl.
| | |
|---|---|
| *B60W 40/12* | (2012.01) |
| *B60R 25/25* | (2013.01) |
| *E05B 83/36* | (2014.01) |
| *E05F 15/73* | (2015.01) |

(52) U.S. Cl.
CPC ............. *B60W 40/12* (2013.01); *B60R 25/25* (2013.01); *E05B 83/36* (2013.01); *E05F 15/73* (2015.01); *E05F 2015/767* (2015.01)

(58) Field of Classification Search
CPC ..... E05F 15/73; E05F 15/76; E05F 2015/767; B60R 25/25; B60W 40/12; E05B 83/36
See application file for complete search history.

(56) References Cited

U.S. PATENT DOCUMENTS

| | | | |
|---|---|---|---|
| 2018/0290627 A1* | 10/2018 | Hariri ................... | B60R 25/245 |
| 2023/0339431 A1* | 10/2023 | Kuehner ............... | B60R 25/305 |
| 2025/0198221 A1* | 6/2025 | Wuest .................... | E05F 15/76 |

FOREIGN PATENT DOCUMENTS

JP          2018-178506 A     11/2018

* cited by examiner

*Primary Examiner* — Jay Khandpur
(74) *Attorney, Agent, or Firm* — Rankin, Hill & Clark LLP

(57) ABSTRACT

A vehicle control apparatus includes: an approach detection section; a determination section; and an openable and closeable object operation control section. The approach detection section detects a person within a first detection range and a second detection range. The determination section determines whether or not a motion of a person detected by the approach detection section corresponds to an approach pattern in which the openable and closeable object is approached. The openable and closeable object operation control section brings an openable and closeable object operation unit into operation when the determination section determines that the motion corresponds to the approach pattern. When a person who is not detected within the first detection range is detected within the second detection range, the determination section determines that the motion of the person corresponds to the approach pattern.

12 Claims, 6 Drawing Sheets

VEHICLE CONTROL APPARATUS, VEHICLE CONTROL METHOD, AND STORAGE MEDIUM

INCORPORATION BY REFERENCE

The present application claims priority under 35 U.S.C. § 119 to Japanese Patent Application No. 2023-032488 filed on Mar. 3, 2023. The content of the application is incorporated herein by reference in its entirety.

BACKGROUND OF THE INVENTION

Field of the Invention

The present invention relates to a vehicle control apparatus, a vehicle control method, and a storage medium.

Description of the Related Art

In recent years, more active efforts have been made to provide access to a sustainable transportation system that takes into consideration even people at vulnerable positions such as elderly people and children among traffic participants. To achieve this, efforts have been invested in research and development for still further improving traffic safety and convenience by developing the easiness of getting in and out of vehicles. As this type of technology, for example, technology has been proposed that calculates the movement direction of a mobile user terminal or a portable key by receiving radio waves from the user terminal or the portable key with a plurality of antennas and unlocks the doors of a vehicle (see, for example, Japanese Patent Laid-Open No. 2018-178506).

The conventional technology described above has to have a configuration in which the mobile user terminal or the portable key transmits radio waves. It is therefore desired that technology for moving an openable and closeable object such as a door of a vehicle in accordance with the will of a user be more casually available to the user.

To solve the problem described above, an object of the present application is to allow a user to more casually use control to bring an openable and closeable object of a vehicle into operation when the user comes closer to the vehicle. This eventually contributes to the development of a sustainable transportation system.

SUMMARY OF THE INVENTION

An aspect for achieving the object described above is a vehicle control apparatus including: an approach detection section; a determination section; and an openable and closeable object operation control section. The approach detection section is configured to detect a person within a first detection range and a second detection range. The first detection range includes an area in a rear direction of a vehicle. The second detection range corresponds to a side surface of the vehicle on which an openable and closeable object is provided. The determination section is configured to determine whether or not a motion of a person detected by the approach detection section corresponds to an approach pattern in which the openable and closeable object is approached. The openable and closeable object operation control section is configured to bring an openable and closeable object operation unit into operation when the determination section determines that the motion corresponds to the approach pattern. The openable and closeable object operation unit at least releases a lock of the openable and closeable object or performs an opening operation of opening the openable and closeable object. When a person who is not detected within the first detection range is detected within the second detection range by the approach detection section, the determination section determines that the motion corresponds to the approach pattern.

When a motion of a person detected around a vehicle corresponds to a pattern in which the vehicle is approached, the vehicle control apparatus described above releases a lock of an openable and closeable unit of the vehicle or performs an opening operation on the openable and closeable unit of the vehicle. This makes it possible to implement control to bring the openable and closeable object of the vehicle into operation when a user comes closer to the vehicle even without any specific apparatus. It is thus possible to make the control to bring the openable and closeable object of the vehicle into operation more casually available when the user comes closer to the vehicle and eventually contribute to the development of a sustainable transportation system.

DETAILED DESCRIPTION OF THE PREFERRED EMBODIMENTS

1. Configurations of Vehicle and Sensing Range

Figure 1:
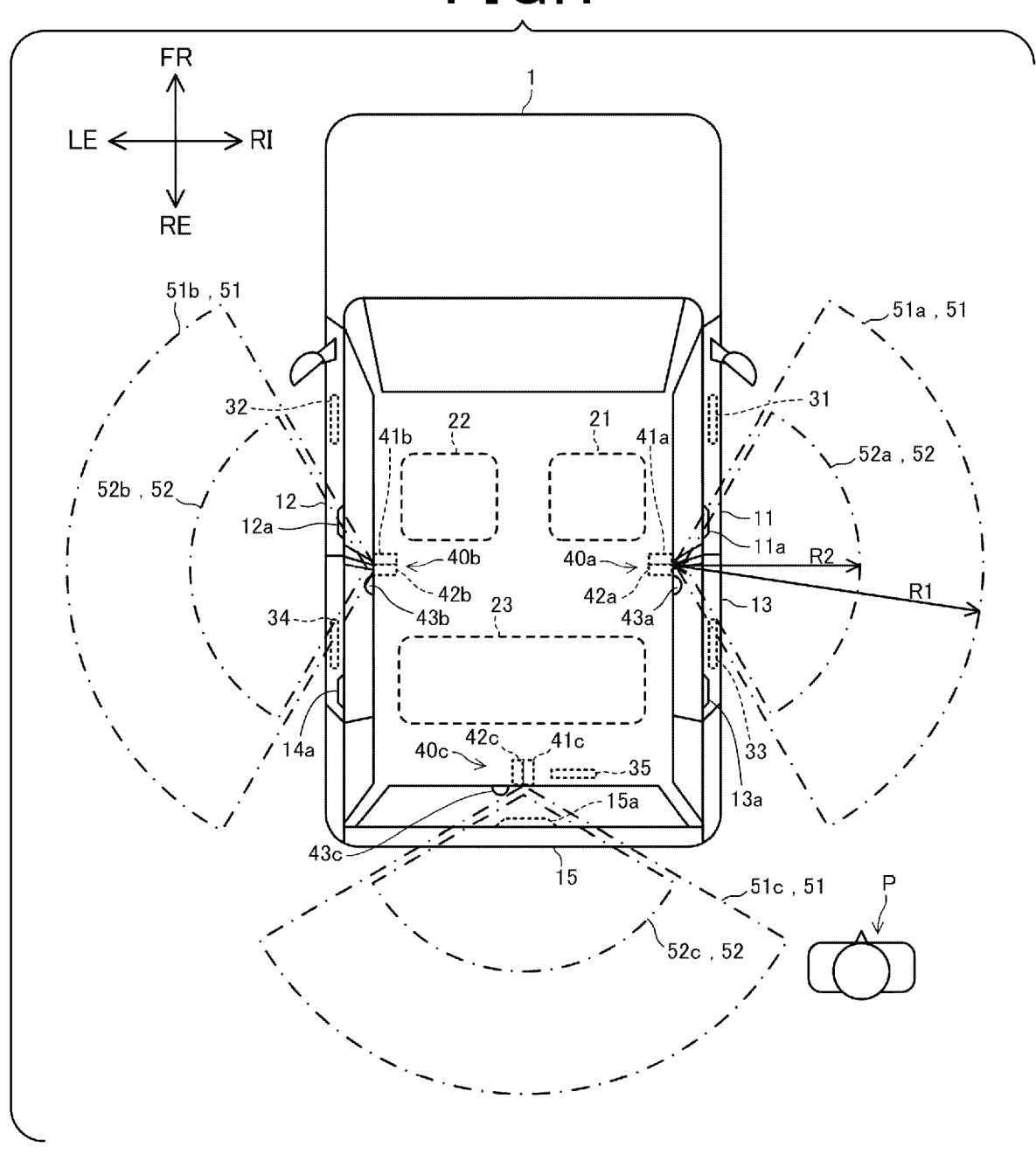
FIG. 1 is a plan view illustrating a configuration of a vehicle and a sensing range.
Figure 2:
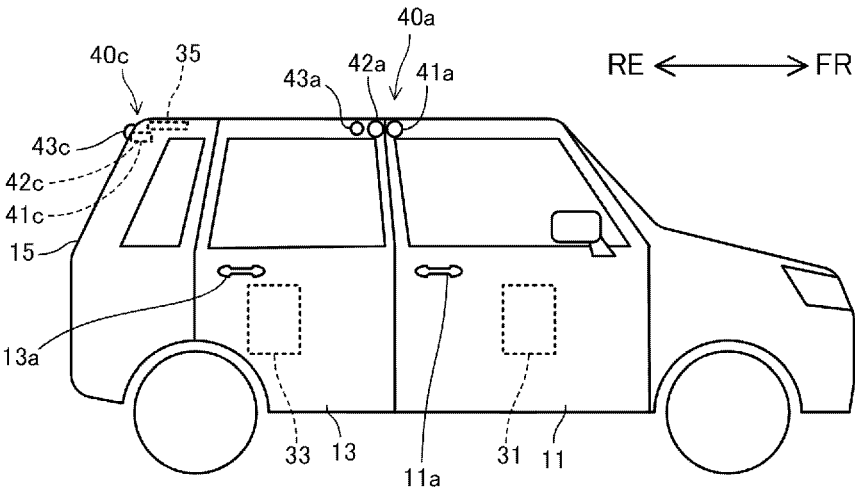
FIG. 2 is a side view illustrating the configuration of the vehicle.

A configuration of each of units of a vehicle 1 mounted with a vehicle control apparatus 100 according to the present embodiment will be described with reference to FIGS. 1 and 2. FIG. 1 is a plan view illustrating a configuration of the vehicle 1 and a sensing range 51. FIG. 2 is a side view illustrating the configuration of the vehicle 1.

In the present embodiment, a description will be given by using, as an example, a case where the vehicle 1 mounted with the vehicle control apparatus 100 is a four-wheeled automobile including a plurality of openable and closeable objects as illustrated in each of FIGS. 1 and 2. Specifically, the vehicle 1 is a hatchback automobile including a front door 11, a front door 12, a rear door 13, a rear door 14, and a rear gate 15 as openable and closeable objects. This is an example and it is sufficient if the vehicle 1 is a mobile object that includes an openable and closeable object and allows a user to climb up and down by opening the openable and closeable object. The vehicle 1 may include any number of openable and closeable objects and the size and application of the vehicle 1, the type of a driving source, the specifications of a wheel, and the like are not limited. In addition, the openable and closeable object is an openable and closeable member that is provided on an outer surface of the vehicle 1 and particularly refers to a member that is opened and closed for the purpose of allowing a person P to climb up into the vehicle 1 and climb down from the vehicle 1 and the purpose of allowing the person P to load luggage into the vehicle 1 and unload luggage from the vehicle 1.

Although described in detail below, the vehicle control apparatus 100 is an apparatus or a device that includes a processor, a memory, an interface circuit, and the like and controls the actuation of the vehicle 1. The vehicle control apparatus 100 is, for example, an electronic control unit (ECU).

In each of FIGS. 1 and 2, the respective directions of the front, rear, right, and left of the vehicle 1 are denoted by reference signs FR, RE, RI, and LE. The front direction FR is the traveling direction of the traveling vehicle 1 and the rear direction RE is the direction of the vehicle 1 that is backing up. The vehicle 1 includes a driver's seat 21, a passenger seat 22, and a back seat 23 as seats on which occupants (users) sit down. In the present embodiment, the driver's seat 21 on which a user who is a driver sits down is disposed on the right side of the vehicle 1 and the passenger seat 22 is disposed on the left side of the vehicle 1, but this is an example. The driver's seat 21 and the passenger seat 22 may be each disposed on the opposite side in accordance with the specifications of the vehicle 1.

The front door 11 is provided in the front of the vehicle 1 on the right side surface and the rear door 13 is provided in the rear direction of the front door 11. The front door 12 is provided in the front of the vehicle 1 on the left side surface and the rear door 14 is provided in the rear direction of the front door 12. The front doors 11 and 12 are respectively provided with door handles 11a and 12a. The rear doors 13 and 14 are respectively provided with door handles 13a and 14a and a door handle 15a is attached to the rear gate 15. Each of the door handles 11a, 12a, 13a, 14a, and 15a is a handle that a user grasps to open the door.

The front door 11 is opened and closed when a user who takes the driver's seat 21 climbs up and down and the front door 12 is opened and closed when a user who takes the passenger seat 22 climbs up and down. The rear door 13 and the rear door 14 are each opened and closed, for example, when a user who takes the back seat 23 climbs up and down and when a user who takes the driver's seat 21 or the passenger seat 22 puts luggage on the back seat 23. The rear gate 15 is a door provided at the rear end of the vehicle 1 and is opened and closed for allowing a user to put luggage in the luggage space in the rear of the vehicle body of the vehicle 1.

Figure 3:
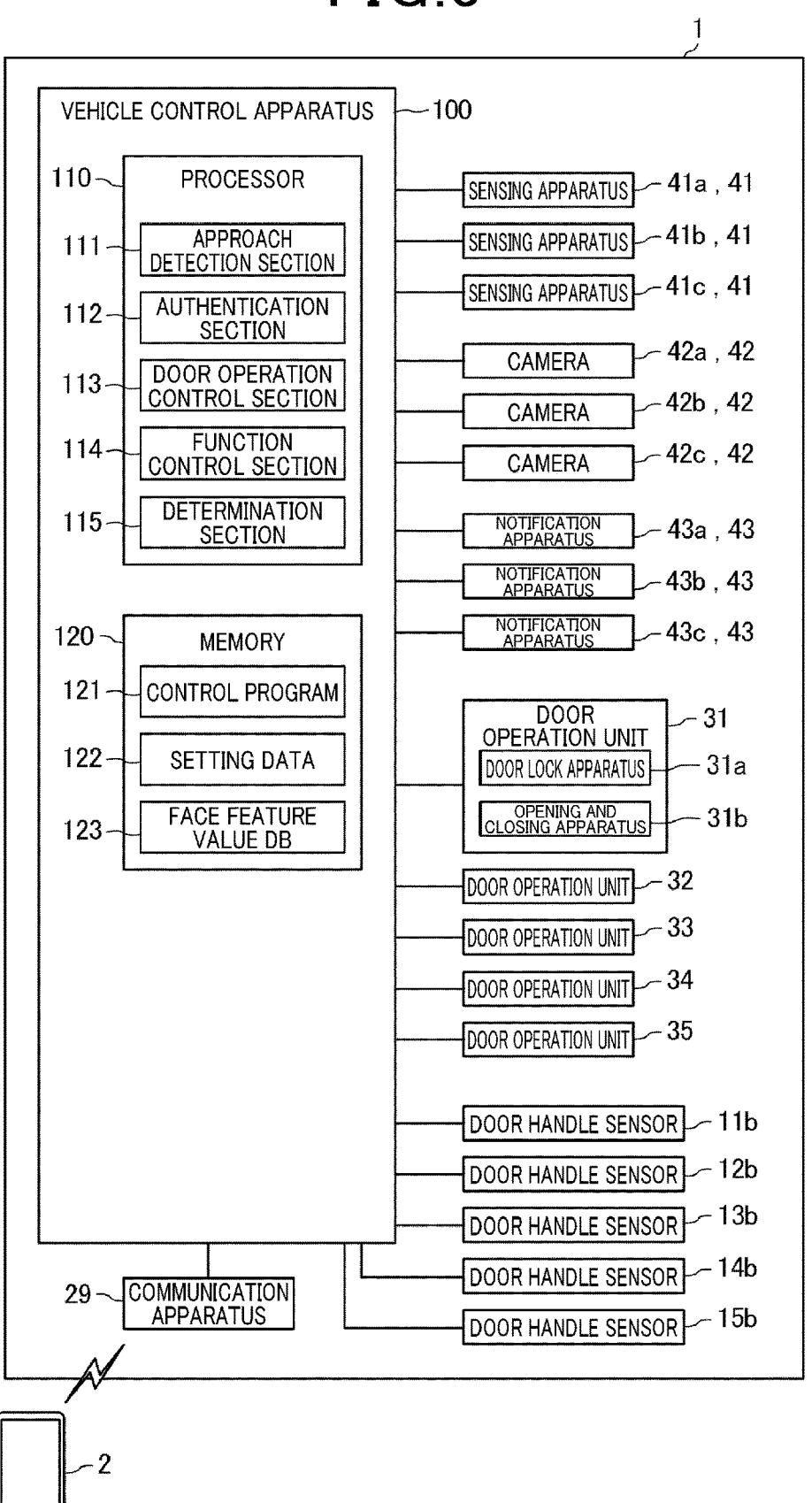
FIG. 3 is a block diagram of a control system of the vehicle.

The front door 11 incorporates a door operation unit 31. The door operation unit 31 includes a door lock apparatus that releases and sets the door lock of the front door 11 as described below. In addition, the door operation unit 31 may include an apparatus that opens the front door 11 with the motive power of a motor or an actuator and the door operation unit 31 may further include an apparatus that closes the front door 11 with motive power. In the present embodiment, a configuration is exemplified in which the door operation unit 31 includes a door lock apparatus 31a and an opening and closing apparatus 31b as illustrated in FIG. 3. The door lock apparatus 31a is an apparatus that locks the front door 11 to prevent the door from opening, and sets and releases the lock in accordance with the control of the vehicle control apparatus 100. The opening and closing apparatus 31b includes an unillustrated motor or actuator and performs an opening operation of opening the front door 11 and a closing operation of closing the front door 11.

The front door 12 incorporates a door operation unit 32, the rear door 13 incorporates a door operation unit 33, and the rear door 14 incorporates a door operation unit 34. The rear gate 15 incorporates a door operation unit 35. The door operation units 32, 33, 34, and 35 each include an apparatus that sets and releases the door lock as with the door operation unit 31. The door operation unit 32 also includes an apparatus that performs an opening operation and a closing operation on the front door 12 as with the door operation unit 31. The same applies to the door operation units 33, 34, and 35. Each of the door operation units 31, 32, 33, 34, and 35 corresponds to an example of an openable and closeable object operation unit.

The vehicle 1 has a so-called smart entry function of performing authentication as to whether or not the person P is a user registered in advance when the person P approaches the vehicle 1 and, for example, releasing the door lock of the front door 12 of the vehicle 1 when the authentication is established.

As the smart entry function, the vehicle 1 detects the person P who approaches the vehicle 1 from the right direction, the left direction, or the rear direction of the vehicle 1 and performs authentication as to a user of the vehicle 1 registered in advance. The authentication as to a user refers to the authentication of the detected person P as a registered user of the vehicle 1. As components that detect and authenticate the person P, the vehicle 1 includes detection units 40a, 40b, and 40c.

The detection unit 40a is disposed on the right side surface of the vehicle 1. In the configuration of each of FIGS. 1 and 2, the detection unit 40a is buried and installed in the outer surface of the center pillar of the vehicle 1 between the front door 11 and the rear door 13. The detection unit 40b is disposed on the left side surface of the vehicle 1. The detection unit 40b is positioned between the front door 12 and the rear door 14, and buried and installed, for example, in the outer surface of the center pillar of the vehicle 1. The detection unit 40c is disposed on the rear surface of the vehicle 1. For example, the detection unit 40c is buried and installed in the upper portion of the rear gate 15.

As illustrated in FIG. 2, the detection unit 40a includes a sensing apparatus 41a, a camera 42a, and a notification apparatus 43a. The sensing apparatus 41a senses the presence of the person P within a sensing range 51a in the right direction of the vehicle 1. As a specific configuration of the sensing apparatus 41a, a passive infrared ray (PIR) sensor, a camera, a radar, or another apparatus is usable. As the radar, a millimeter wave radar that uses, for example, a frequency band of 30 GHz to 300 GHz is usable. A range within which the sensing apparatus 41a is capable of sensing the person P is set, for example, to allow the sensing apparatus 41a to sense the person P within a range of about 90° to 180° in the horizontal direction and about 90° to 150° in the vertical direction within a distance R1 from the sensing apparatus 41a. In this case, the range within which the sensing apparatus 41a is capable of sensing the person P is the fan-shaped sensing range 51a illustrated in FIG. 1.

The camera 42a is a color or monochrome digital camera. The vehicle control apparatus 100 authenticates the person P as a registered user by checking an image captured by the camera 42a against a face image of a person registered as a user of the vehicle 1 in advance. The position of the person P at which the vehicle control apparatus 100 is capable of authentication is described as an authentication range 52a. The fan-shaped authentication range 52a illustrated in FIG. 1 is, for example, a range of about 90° to 150° in the horizontal direction and about 90° to 150° in the vertical direction within a distance R2 from the camera 42a. A radius R1 of the sensing range 51a is longer than a radius R2 of the authentication range 52a. That is, when the person P approaches the vehicle 1, the person P first enters the sensing range 51a to be sensed by the sensing apparatus 41a. When the person P enters the authentication range 52a after that, the vehicle control apparatus 100 uses the camera 42a to authenticate the person P.

The notification apparatus 43a issues a notification of the operation state of the detection unit 40a. The notification apparatus 43a is an indicator including, for example, a light emitting diode (LED), an organic EL illumination element, or another illuminant. The notification apparatus 43a is on or is blinking, for example, while the camera 42a is capturing an image in accordance with the control of the vehicle control apparatus 100. This makes it possible to inform the person P outside the vehicle 1 of the operation state of the detection unit 40a.

The detection unit 40b includes a sensing apparatus 41b and a camera 42b as with the detection unit 40a. In addition, the detection unit 40c includes a sensing apparatus 41c and a camera 42c. For example, the sensing apparatuses 41b and 41c each have a configuration common to that of the sensing apparatus 41a. In this case, a sensing range 51b that is a range within which the sensing apparatus 41b senses the person P and a sensing range 51c that is a range within which the sensing apparatus 41c senses the person P are the same as the sensing range 51a in shape and size. In addition, for example, the cameras 42b and 42c each have a configuration common to that of the camera 42a. In this case, an authentication range 52b that is a range within which it is possible to authenticate the person P by using the camera 42b and an authentication range 52c that is a range within which it is possible to authenticate the person P by using the camera 42c are the same as the authentication range 52a in shape and size.

In this case, it is possible for the vehicle 1 to sense the person P within the sensing ranges 51a and 51b in the lateral direction of the vehicle 1 and the sensing range 51c in the rear direction of the vehicle 1. It is then possible for the vehicle 1 to authenticate the person P when the person P is within any of the authentication ranges 52a, 52b, and 52c in the lateral direction of the vehicle 1 and the rear direction of the vehicle 1.

In the following description, when the sensing ranges 51a, 51b, and 51c are not distinguished, the sensing ranges 51a, 51b, and 51c will be each described as a sensing range 51. Similarly, when the authentication ranges 52a, 52b, and 52c are not distinguished, the authentication ranges 52a, 52b, and 52c will be each described as an authentication range 52.

2. Configuration of Vehicle Control Apparatus

FIG. 3 is a block diagram of a control system of the vehicle 1. The control system of the vehicle 1 has a configuration in which each unit of the vehicle 1 is connected to the vehicle control apparatus 100.

The vehicle control apparatus 100 includes a processor 110 and a memory 120. The processor 110 is a computer including, for example, a central processing unit (CPU), a micro controller unit (MCU), and a micro processor unit (MPU). The memory 120 is a rewritable non-volatile storage apparatus and stores a program that is executed by the processor 110 and data that is processed by the processor 110. The memory 120 includes, for example, a semiconductor storage device such as a flash read only memory (ROM) or a solid state disk (SSD), or a magnetic storage device. The memory 120 may include a random access memory (RAM) that forms a work area for temporarily storing a program and data. The vehicle control apparatus 100 may include an integrated circuit (IC) that integrally includes the processor 110 and the memory 120.

The memory 120 stores a control program 121 to allow the processor 110 to read the control program 121. The control program 121 is executed by the processor 110. As the data that is processed by the processor 110, the memory 120 stores setting data 122. In addition, the storage region of the memory 120 is provided with a face feature value data base (DB) 123.

The sensing apparatuses 41a, 41b, and 41c are connected to the vehicle control apparatus 100. In addition, the cameras 42a, 42b, and 42c and the notification apparatuses 43a, 43b, and 43c are each connected to the vehicle control apparatus 100. In the following description, when the sensing apparatuses 41a, 41b, and 41c are not distinguished, the sensing apparatuses 41a, 41b, and 41c will be each described as a sensing apparatus 41. Similarly, when it is unnecessary to distinguish the individual apparatuses, the cameras 42a, 42b, and 42c will be each described as a camera 42 and the notification apparatuses 43a, 43b, and 43c will be each described as a notification apparatus 43.

The sensing apparatus 41 senses the person P within the sensing range 51 in accordance with the control of the vehicle control apparatus 100 and outputs a result of the sensing to the vehicle control apparatus 100. The camera 42 captures an image in accordance with the control of the vehicle control apparatus 100 and outputs the captured image to the vehicle control apparatus 100. The notification apparatus 43 is turned on or blinks in accordance with the control of the vehicle control apparatus 100.

The door operation units 31, 32, 33, 34, and 35 are each connected to the vehicle control apparatus 100. As described above, in the present embodiment, the door operation unit 31 includes the door lock apparatus 31a and the opening and closing apparatus 31b. The door lock apparatus 31a included in the door operation unit 31 sets and releases the door lock of the front door 11 in accordance with the control of the vehicle control apparatus 100. The opening and closing apparatus 31b performs an opening operation and a closing operation on the front door 11 in accordance with the control of the vehicle control apparatus 100. The door operation units 32, 33, 34, and 35 set and release the locks of the respective doors or the rear gate, and perform opening operations and closing operations in accordance with the control of the vehicle control apparatus 100 as with the door operation unit 31. Each of the door locks is an example of the lock of the openable and closeable object.

A door handle sensor 11b is connected to the vehicle control apparatus 100. The door handle sensor 11b is a sensor that is provided to the door handle 11a and senses an operation on the door handle 11a. The door handle sensor 11b includes, for example, a capacitance sensor that senses a contacting operation, a push button switch that is turned on by a pushing operation, or another sensor or switch. The door handle sensors 12b, 13b, 14b, and 15b are sensors that are provided to the respective door handles 12a, 13a, 14a, and 15a and sense operations on the door handles 12a, 13a, 14a, and 15a. The door handle sensors 12b, 13b, 14b, and 15b are each configured, for example, as with the door handle sensor 11b.

When the door handle sensor 11b senses an operation on the door handle 11a, the door handle sensor 11b outputs a sensing signal to the vehicle control apparatus 100. Similarly, when the door handle sensors 12b, 13b, 14b, and 15b respectively sense operations on the door handles 12a, 13a, 14*a*, and 15*a*, the door handle sensors 12*b*, 13*b*, 14*b*, and 15*b* output sensing signals to the vehicle control apparatus 100.

A communication apparatus 29 is connected to the vehicle control apparatus 100. The communication apparatus 29 is an apparatus that communicates with an apparatus outside the vehicle 1 in accordance with the control of the vehicle control apparatus 100. The communication apparatus 29 is a wireless communication apparatus that includes, for example, an antenna which transmits and receives wireless signals, a baseband circuit, an RF circuit, and the like and executes functions of a transmitter and a receiver.

The communication apparatus 29 executes near-field communication. The communication apparatus 29 executes near-field communication that is, for example, compliant with any of Bluetooth®, Ultra Wide Band (UWB), and another communication scheme. The communication apparatus 29 may be configured to be capable of executing wireless data communication in accordance with a cellular communication scheme such as long term evolution (LTE) or the fifth-generation mobile communication scheme (5G).

The communication apparatus 29 executes near-field communication with a terminal apparatus 2 positioned near the vehicle 1. In addition, the communication apparatus 29 may execute cellular communication and may execute data communication with the terminal apparatus 2 through an unillustrated base station or server.

The terminal apparatus 2 is an apparatus that is used by a person registered as a user of the vehicle 1, and transmits a signal to the communication apparatus 29 by using a near-field communication function. The terminal apparatus 2 is, for example, a smartphone, a tablet computer, or a notebook computer. The terminal apparatus 2 may also be an FOB key.

The sensing apparatus 41, the camera 42, the notification apparatus 43, the door operation units 31, 32, 33, 34, and 35, and the door handle sensors 11*b*, 12*b*, 13*b*, 14*b*, and 15*b* each operate by electric power supplied from an unillustrated battery of the vehicle 1. The vehicle control apparatus 100 is capable of performing control to start the supply of electric power to each of the units including the sensing apparatus 41 and the camera 42 and performing control to stop the supply of electric power. For example, the vehicle control apparatus 100 is connected to an unillustrated electric power supply circuit that supplies electric power to each of the units including the sensing apparatus 41 and the camera 42 and configured to perform controls to start and stop the supply of electric power by switching a switch incorporated in the electric power supply circuit.

The processor 110 includes an approach detection section 111, an authentication section 112, a door operation control section 113, a function control section 114, and a determination section 115. These components are implemented by the processor 110 executing the control program 121.

The approach detection section 111 detects the person P who approaches the vehicle 1 on the basis of a result of sensing by the sensing apparatus 41. The approach detection section 111 identifies the sensing range 51 within which the person P is sensed among the sensing ranges 51*a*, 51*b*, and 51*c* by identifying the sensing apparatus 41 that senses the person P.

The authentication section 112 executes authentication as to whether or not the person P is a person registered as a user of the vehicle 1 on the basis of an image captured by the camera 42. Determining by the authentication section 112 that the person P is a registered user of the vehicle 1 is referred to as authentication establishment. Authentication failure and authentication non-establishment mean that the authentication section 112 does not determine that the person P is a user of the vehicle 1.

As a specific technique for the authentication section 112 to perform authentication, a variety of publicly known methods are usable. In the present embodiment, an example is demonstrated in which the vehicle control apparatus 100 includes the face feature value DB 123 in the memory 120 and the authentication section 112 performs authentication by using the face feature value DB 123. The face feature value DB 123 is a data base in which a feature value of an image of the face of a person registered as a user of the vehicle 1 is accumulated. The user of the vehicle 1 includes a person who drives the vehicle 1. A person who does not drive the vehicle 1, but gets in the vehicle 1 may be registered as the user.

The authentication section 112 may be configured to be capable of executing processing of registering a user of the vehicle 1. In this case, the authentication section 112 obtains a still image of the face of the user from an image captured by the camera 42 or another camera. The authentication section 112 extracts a region having a general feature value of a face from the obtained still image as the face region. The general feature value of a face is, for example, the shape of the outline of the face, the positions of the eyes and the nose relative to the outline, and another feature. The face region refers to a face image portion of the still image. The authentication section 112 sets a feature point in the face region. For example, the authentication section 112 searches the face region and the authentication section 112 sets a feature point on an eye, an eyebrow, the nose, the outline, or the like. A position at which a feature point is set and the number of feature points are set in advance by the authentication section 112 or decided by algorithm included in the control program 121. The authentication section 112 detects the feature value of a feature point and stores the detected feature value in the face feature value DB 123 in association with the user.

When the authentication section 112 performs authentication, the authentication section 112 obtains an image captured by the camera 42. For example, when the camera 42 captures a still image, the authentication section 112 obtains the one image captured by the camera 42. In addition, for example, when the camera 42 captures a moving image, the authentication section 112 obtains the image captured by the camera 42 for each of the frames and uses the image of the one obtained frame as one captured image. This one captured image is a still image.

The authentication section 112 extracts a face region that is an image of a human face from the one obtained captured image. The authentication section 112 sets feature points on the extracted face region as described above and detects the feature value of each of the feature points. The authentication section 112 compares a feature value detected in the captured image and a feature value stored in the face feature value DB 123 and calculates the matching rate between the feature values. The matching rate between the feature values is a so-called matching score. For example, after the authentication section 112 calculates the matching rate between the feature values for each feature point, the authentication section 112 calculates the matching rate of the one captured image on the basis of the calculated matching rate for each of the feature points. The authentication section 112 authenticates the person P as a user of the vehicle 1 on the basis of the matching rate. Specifically, when the matching rate is higher than or equal to a determination threshold set in advance, the authentication section 112 determines that an image captured by the camera 42 includes a candidate for a face image of a user. When the authentication section 112 determines that the image captured by the camera 42 includes a candidate for a face image of a user, the authentication by the authentication section 112 is established. Authentication performed by using a captured image that is one still image and authentication performed by using the image of one frame obtained from a moving image mean that authentication is performed once. When the face feature value DB 123 stores feature values of a plurality of users, the authentication section 112 selects a feature value of one person from the feature values stored in the face feature value DB 123 and repeatedly executes, by the number of registered users, processing of making a determination by calculating the matching rate with a feature value detected in a captured image.

The authentication section 112 executes authentication a plurality of times. That is, the authentication section 112 obtains the images of a plurality of frames from a moving image that is an image captured by the camera 42 and performs the authentication described above for each of the frames, or obtains a plurality of still images that is images captured by the camera 42 and performs the authentication described above for each of the still images. When authentication is established a number of times designated in advance (referred to as an authentication criterion number of times below) or more in a row or when authentication is established that uses a plurality of consecutive frames or authentication is established that uses a plurality of images consecutively captured, the authentication section 112 decides authentication completion. The authentication completion of the authentication section 112 refers to fixing a result of the authentication indicating that the person P is a user of the vehicle 1. In other words, authentication performed once by the authentication section 112 with one frame or one captured image can be considered tentative authentication and the authentication section 112 finally decides the completion of authentication as to a user of the vehicle 1 on the condition that the tentative authentication is established an authentication criterion number of times. Deciding authentication completion by the authentication section 112 means that a result of the authentication indicating that the person P is a user of the vehicle 1 is fixed. This equivalently means that the person P is a user of the vehicle 1 and the person P is about to get in the vehicle 1.

The authentication section 112 may use authentication established an authentication criterion number of times or more with an image captured by the one camera 42 as a condition for deciding authentication completion. For example, when the authentication section 112 obtains a plurality of frames corresponding to the authentication criterion number of times from a moving image captured by the camera 42a and the tentative authentication described above is established by using the plurality of obtained frames, the authentication section 112 decides authentication completion. In addition, for example, when the authentication section 112 obtains a plurality of captured images corresponding to the authentication criterion number of times from still images captured by the camera 42a and the tentative authentication described above is established by using the plurality of obtained captured images, the authentication section 112 decides authentication completion.

Authentication performed once by the authentication section 112, that is, tentative authentication is not limited to an example in which only one captured image that is a still image or the image of one frame is used. Authentication performed by the authentication section 112 with a predetermined number of captured images more than or equal to two captured images may be treated as authentication performed once. In this case, the authentication section 112 compares feature values, calculates the matching score by using, for example, one captured image, and makes determinations, adds up results of determinations as to the matching scores for a predetermined number of frames, and determines that tentative authentication is established when a large number of captured images have matching scores higher than or equal to the determination threshold.

In addition, for example, the authentication section 112 may add up feature values detected in the face regions of a predetermined number of captured images, obtain the average or another statistic, compare the obtained statistic with a feature value of the face feature value DB 123, and calculate the matching score.

Needless to say, it is possible for the authentication section 112 to perform authentication once in another method by using a plurality of captured images.

The door operation control section 113 brings any one or more of the door operation units 31, 32, 33, 34, and 35 into operation to at least release the door locks or perform opening operations on the doors.

The function control section 114 starts the camera 42 when the approach detection section 111 detects the person P. The camera 42 is used for authentication by the authentication section 112. A timing at which the function control section 114 starts the camera 42 is thus, for example, the entry of the person P detected by the approach detection section 111 to the authentication range 52 or immediately before the entry of the person P to the authentication range 52. Specifically, the function control section 114 starts the camera 42 at the timing at which the distance between the person P detected by the approach detection section 111 and the sensing apparatus 41 grows shorter than or equal to the distance R2. For example, the approach detection section 111 controls the sensing apparatus 41 to detect the distance between the sensing apparatus 41 and the person P.

When the approach detection section 111 detects the person P by using the sensing apparatus 41, the function control section 114 identifies the sensing apparatus 41 that senses the person P within the distance R2 from the sensing apparatus 41. The function control section 114 starts the camera 42 corresponding to the identified sensing apparatus 41. For example, when the sensing apparatus 41a senses the person P and the person P reaches a position within the sensing range 51a within the distance R2 from the sensing apparatus 41a, the function control section 114 starts the camera 42a.

After the function control section 114 starts the camera 42, the authentication section 112 obtains an image captured by the started camera 42 and starts authentication.

When authentication by the authentication section 112 is established, the determination section 115 determines whether or not a moving path of the person P corresponds to an approach pattern in which the vehicle 1 is approached. A typical approach pattern for the person P to approach the vehicle 1 is set in the determination section 115 in advance. In the present embodiment, a criterion for the determination section 115 to determine whether or not a moving path of the person P corresponds to the approach pattern is set in advance. Information indicating this criterion is included, for example, in the setting data 122 and stored in the memory 120. The moving path of the person P includes at least any of the trajectory of the movement of the person P in the past and the estimated direction in which the person P is to move by the determination section 115. In the processing that is executed by the determination section 115, the sensing range 51*c* is an example of a first detection range, and the sensing range 51*a* and the sensing range 51*b* are examples of a second detection range. In addition, the sensing apparatus 41*c* that performs sensing within the sensing range 51*c* is an example of a first sensing apparatus, the sensing apparatus 41*a* and the sensing apparatus 41*b* are examples of a second sensing apparatus.

Figure 4:
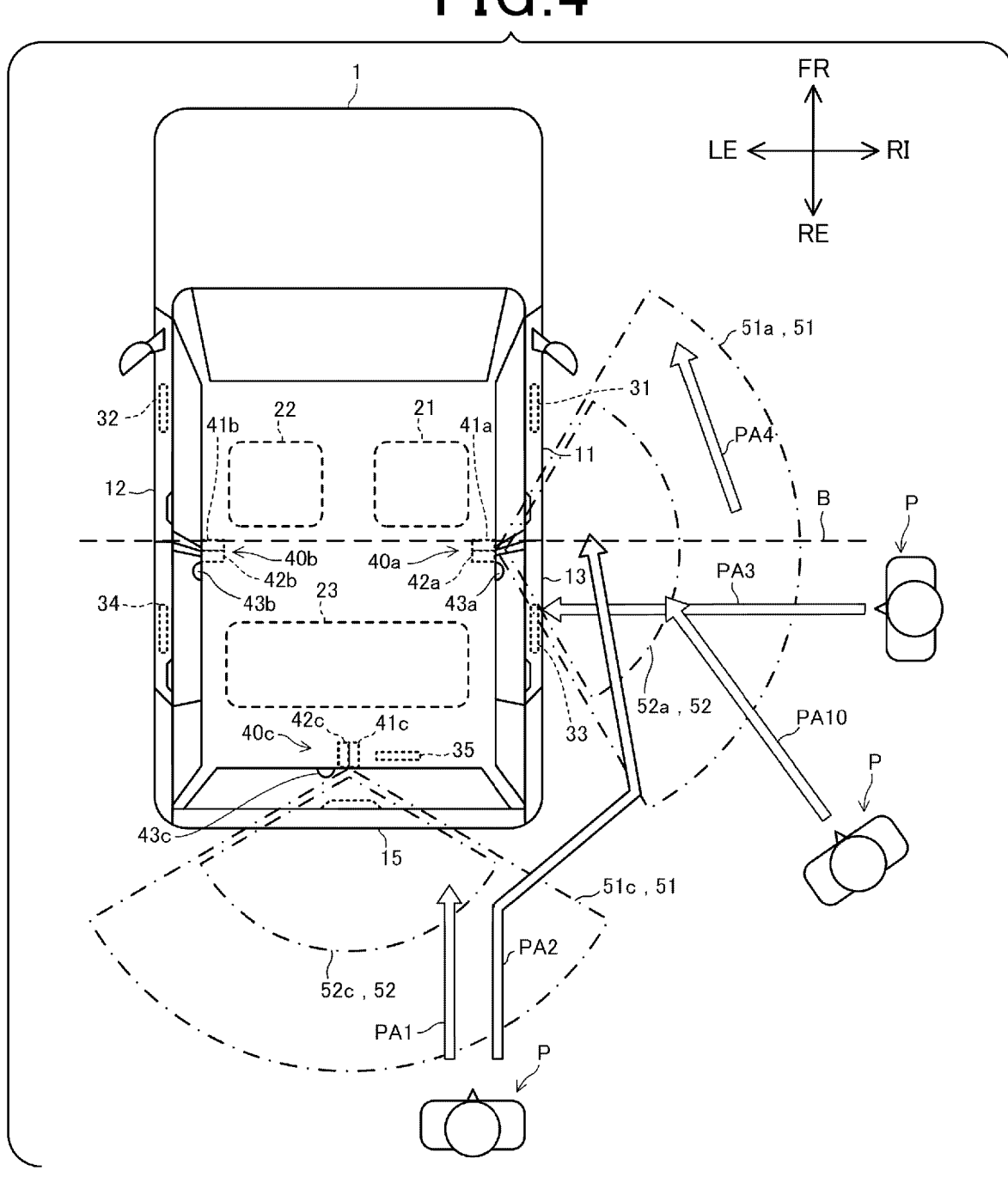
FIG. 4 is an explanatory diagram of a motion of a person.

FIG. 4 is an explanatory diagram of the movement of the person P and a plan view of the vehicle 1 and the person P from the above.

The determination section 115 divides the side surfaces of the vehicle 1 on which the front doors 11 and 12 and the rear doors 13 and 14 are provided in the vehicle 1 into the front and the rear. FIG. 4 illustrates an example of a position that divides the side surfaces of the vehicle 1 into the front and the rear as a dashed line B. The dashed line B is a borderline that passes through the border between the front door 11 and the rear door 13 and is orthogonal to the front-rear direction of the vehicle 1. The dashed line B in FIG. 4 also overlaps with the border between the front door 12 and the rear door 14, but this is not essential.

The vehicle control apparatus 100 identifies a moving path of the person P by the approach detection section 111 controlling the sensing apparatus 41 or the determination section 115 analyzing an image captured by the camera 42. For example, when the sensing apparatus 41 includes a radar or a camera, a result of sensing by the sensing apparatus 41 allows the approach detection section 111 to identify the position of the person P. It is possible for the determination section 115 to obtain the position of the person P, the movement direction of the person P, and the trajectory of the movement of the person P on the basis of a temporal change of the position of the person P identified by the approach detection section 111. In addition, it is possible for the determination section 115 to obtain the position of the person P, the movement direction of the person P, and the trajectory of the movement of the person P by analyzing an image captured by the camera 42. In addition, the determination section 115 may estimate the direction in which the person P is to move on the basis of the position identified by the approach detection section 111 or an image captured by the camera 42. On the basis of these, the determination section 115 identifies the moving path of the person P.

FIG. 4 illustrates approach patterns PA1, PA2, PA3, and PA10 as approach patterns in which the person P approaches the vehicle 1. In addition, a movement pattern PA4 is illustrated as an example of a movement pattern for an approach pattern PA in which the vehicle 1 is not approached.

The approach pattern PA1 is an example of a moving path in which the person P approaches the vehicle 1 from the rear direction of the vehicle 1. For example, when the person P approaches the vehicle 1 while intending to open the rear gate 15, the person P moves along the approach pattern PA1. The approach pattern PA1 passes through the sensing range 51*c*, but does not pass through the sensing range 51*a* and the sensing range 51*b*.

The approach pattern PA2 corresponds to a moving path in which the person P approaches the vehicle 1 from the rear direction of the vehicle 1, changes the direction of the movement, and moves toward the front door 12. The approach pattern PA2 passes through the sensing range 51*c* and then passes through the sensing range 51*a*. The approach pattern PA2 is an example of a moving path in which the person P goes toward the front door 12. The approach pattern PA2 can be regarded as a moving path in which the person P approaches the front door 12 from the rear direction of the vehicle 1.

The approach pattern PA3 corresponds to a moving path in which the person P approaches the rear door 13 of the vehicle 1 from the lateral direction of the vehicle 1. The approach pattern PA3 passes through the sensing range 51*a*. The approach pattern PA3 corresponds to an example of a fourth approach pattern.

The approach pattern PA10 corresponds to a moving path in which the person P diagonally approaches the vehicle 1 from the rear direction and the lateral direction of the vehicle 1. The approach pattern PA10 passes through the sensing range 51*a*, but does not pass through the sensing range 51*c*.

The movement pattern PA4 is a path in which the person P moves in the front direction of the vehicle 1 from the lateral direction of the vehicle 1. When the person P moves along the movement pattern PA4, it is possible to consider that the person P does not have the purpose of getting in the vehicle 1.

The determination section 115 determines whether or not the moving path of the person P corresponds to any of the approach patterns PA1, PA2, PA3, and PA10. When the determination section 115 determines that the moving path of the person P corresponds to any of the approach patterns PA1, PA2, PA3, and PA10, the determination section 115 selects any of the front door 11, the rear door 13, and the rear gate 15 as an openable and closeable unit to be brought into operation. The door operation control section 113 brings the openable and closeable unit selected by the determination section 115 into operation. That is, the door operation control section 113 brings one or more of the door operation units 31, 32, 33, 34, and 35 selected by the determination section 115 into operation and causes the one or more of the door operation units 31, 32, 33, 34, and 35 to release the door locks. After releasing the door locks, the door operation control section 113 may cause the one or more of the door operation units 31, 32, 33, 34, and 35 to execute opening operations. The door operation control section 113 corresponds to an example of an openable and closeable object operation control section.

For example, when the moving path of the person P corresponds to the approach pattern PA1, the person P is considered to move toward the rear gate 15. In this case, the determination section 115 selects the rear gate 15 as an openable and closeable unit to be brought into operation by the door operation control section 113.

In addition, for example, when the moving path of the person P corresponds to the approach pattern PA2, the person P is considered to move toward the front door 11 or the front door 12. In this case, the determination section 115 selects the door closer to the person P from the front door 11 and the front door 12 as an openable and closeable unit to be brought into operation by the door operation control section 113.

In addition, for example, when the moving path of the person P corresponds to the approach pattern PA3, the person P is considered to move toward the rear door 13 or the rear door 14. In this case, the determination section 115 selects the door closer to the person P from the rear door 13 and the rear door 14 as an openable and closeable unit to be brought into operation by the door operation control section 113.

Further, the determination section 115 makes determinations as to approach patterns PA11, PA12, and PA13 subdivided from the approach pattern PA10. The trajectories of the movements of the person P along the approach patterns PA11, PA12, and PA13 are similar to that of the approach pattern PA10. The approach patterns PA11, PA12, and PA13 are distinguished by a change in the movement speed of the person P and the direction of the face of the person P during the movement of the person P like the approach pattern PA10.

Specifically, the approach pattern PA11 corresponds to a motion that does not decrease the movement speed while the person P is moving in the moving path of the person P. The approach pattern PA12 corresponds to a motion that decreases the movement speed while the person P is moving and does not make the person P turn the face to the rear door 13 or the rear door 14 of the vehicle 1 while moving. The approach pattern PA13 corresponds to a motion that decreases the movement speed while the person P is moving and makes the person P turn the face to the rear door 13 or the rear door 14 of the vehicle 1 while moving.

When the person P turns the face to the rear door 13 or the rear door 14 while moving, the person P is considered to have an intention to go toward the rear door 13 or the rear door 14. When the moving path of the person P corresponds to the approach pattern PA13, the person P is thus considered to have an intention to go toward the rear door 13 or the rear door 14. The approach pattern PA13 corresponds to an example of a third approach pattern.

Each of the approach patterns PA11, PA12, and PA13 is a pattern in which the person P approaches the vehicle 1 from the rear direction and the lateral direction of the vehicle 1, and the rear door 13 is thus closer to the person P than the front door 11 on the right side surface of the vehicle 1. The rear door 14 is closer to the person P than the front door 12 on the left side surface of the vehicle 1. When the person P has an intention to go toward the rear door 13 or the rear door 14, the person P has a shorter moving distance than a moving distance for going toward the front door 11 or the front door 12 and the movement speed of the person P thus decreases earlier. When the moving path of the person P corresponds to the approach pattern PA12, the person P is thus considered to have an intention to go toward the rear door 13 or the rear door 14. The approach pattern PA12 corresponds to an example of a second approach pattern.

A moving path that corresponds to the approach pattern PA10, but does not correspond to any of the approach pattern PA12 and the approach pattern PA13 is referred to as the approach pattern PA11. The approach pattern PA11 is considered a path in which the person P goes toward the front door 11 or the front door 12. The approach pattern PA11 corresponds to an example of a first approach pattern.

In FIG. 4 and the following description, an operation of the vehicle control apparatus 100 performed when the person P moves in the right direction of the vehicle 1 will be described, but a function of the vehicle control apparatus 100 is not limited to the right direction of the vehicle 1. That is, the processing of the determination section 115 to determine a moving path of the person P is not limited to the right direction of the vehicle 1, but is also executable similarly in the left direction. The approach patterns PA2, PA3, and PA10 and the movement pattern PA4 illustrated in FIG. 4 are set to display bilateral symmetry with the approach patterns PA2, PA3, and PA10 and the movement pattern PA4 in the left direction of the vehicle 1. The same applies to the approach patterns PA11, PA12, and PA13. These approach patterns and movement patterns are set in the determination section 115 in advance and it is possible to perform processing even when the person P moves in the left direction of the vehicle 1.

The sensing apparatus 41 comes into operation with the vehicle 1 parked. Parked refers to a state in which the speed of the vehicle 1 is speed close to 0 or equal to 0 and a driving source of the vehicle 1 is stopped. For example, when the driving source of the vehicle 1 is an engine, the engine is stopped while the vehicle 1 is parked. In addition, for example, when the driving source of the vehicle 1 is a driving motor, the supply of electric power to an inverter circuit or the like that supplies the driving motor with electric power is stopped while the vehicle 1 is parked. Parking the vehicle 1 includes a state in which a function of the vehicle 1 is stopped and specifically includes a state in which the ignition switch of the vehicle 1 is off. In addition, the vehicle 1 may bring the sensing apparatus 41 into operation with the vehicle 1 parked and nobody in the vehicle 1. While the sensing apparatus 41 is in operation, the approach detection section 111 obtains a result of sensing by the sensing apparatus 41 in a predetermined cycle and detects the person P within the sensing range 51 on the basis of the obtained result of sensing.

The sensing apparatus 41 may come into operation with the vehicle 1 stopped. Stopped refers to a state in which the speed of the vehicle 1 is speed close to 0 or equal to 0 and the driving source of the vehicle 1 is in operation. For example, when the driving source of the vehicle 1 is an engine, the engine is in operation while the vehicle 1 is stopped. In addition, for example, when the driving source of the vehicle 1 is a driving motor, an inverter circuit or the like that supplies the driving motor with electric power is energized and the driving motor is operable while the vehicle 1 is stopped.

It is unnecessary to bring the camera 42 into operation before the person P is detected within the sensing range 51, and the function control section 114 thus keeps the camera 42 stopped until the person P is detected within the sensing range 51. The function control section 114 may then stop the supply of electric power to the camera 42. This makes it possible to reduce the amount of electric power to be consumed for the camera 42. In addition, the authentication section 112 may execute controls to start and stop the camera 42.

FIG. 3 illustrates a variety of ECUs included in the vehicle 1 and some of the components of the vehicle 1. Needless to say, the vehicle 1 can include a component that is not illustrated in FIG. 3. In addition, the vehicle 1 does not have to include all of the components illustrated in FIG. 3. For example, the vehicle 1 does not have to include the door handle sensors 11b, 12b, 13b, 14b, and 15b.

3. Operation of Vehicle Control Apparatus

Figure 5:
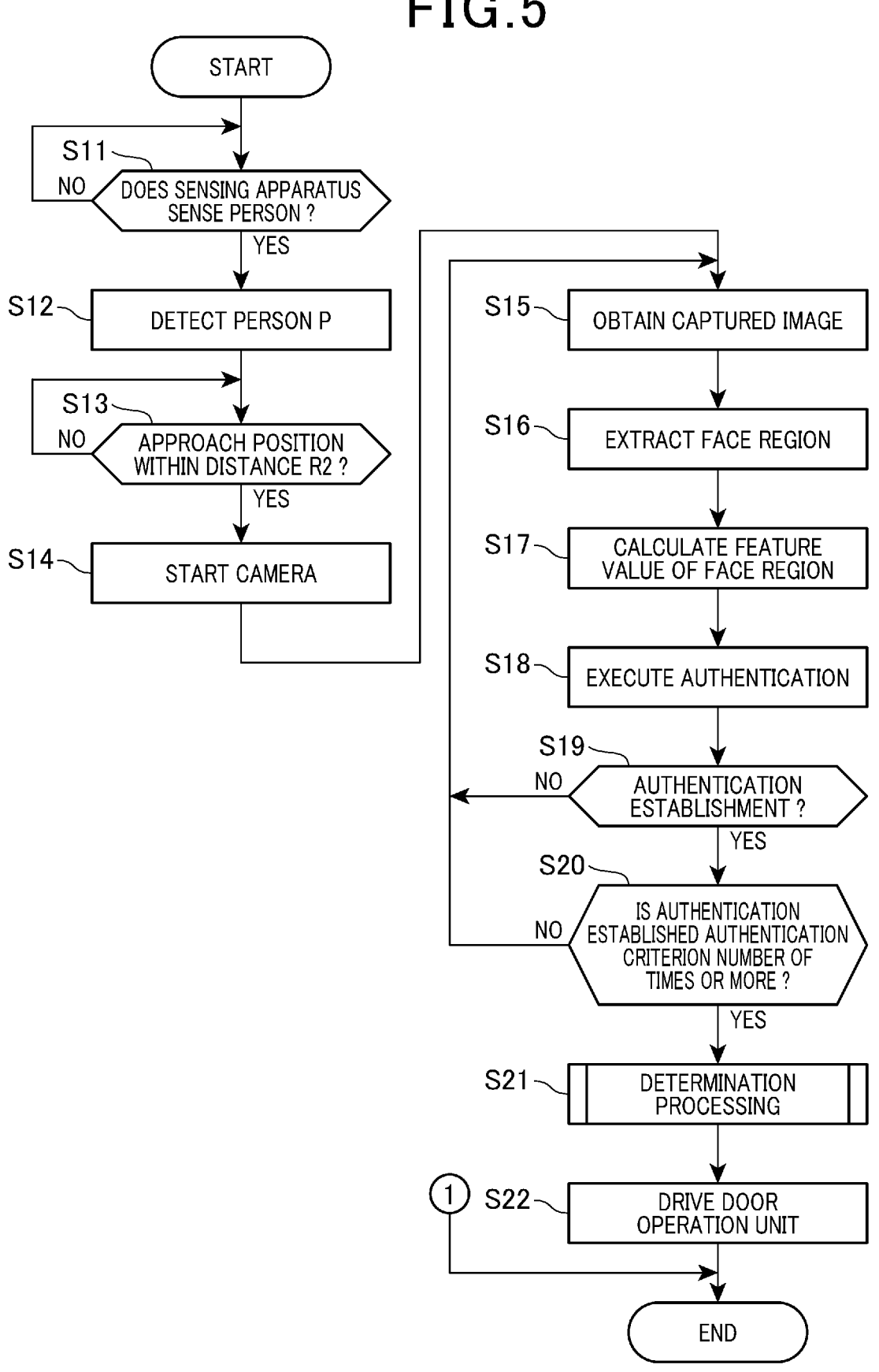
FIG. 5 is a flowchart illustrating an operation of a vehicle control apparatus.
Figure 6:
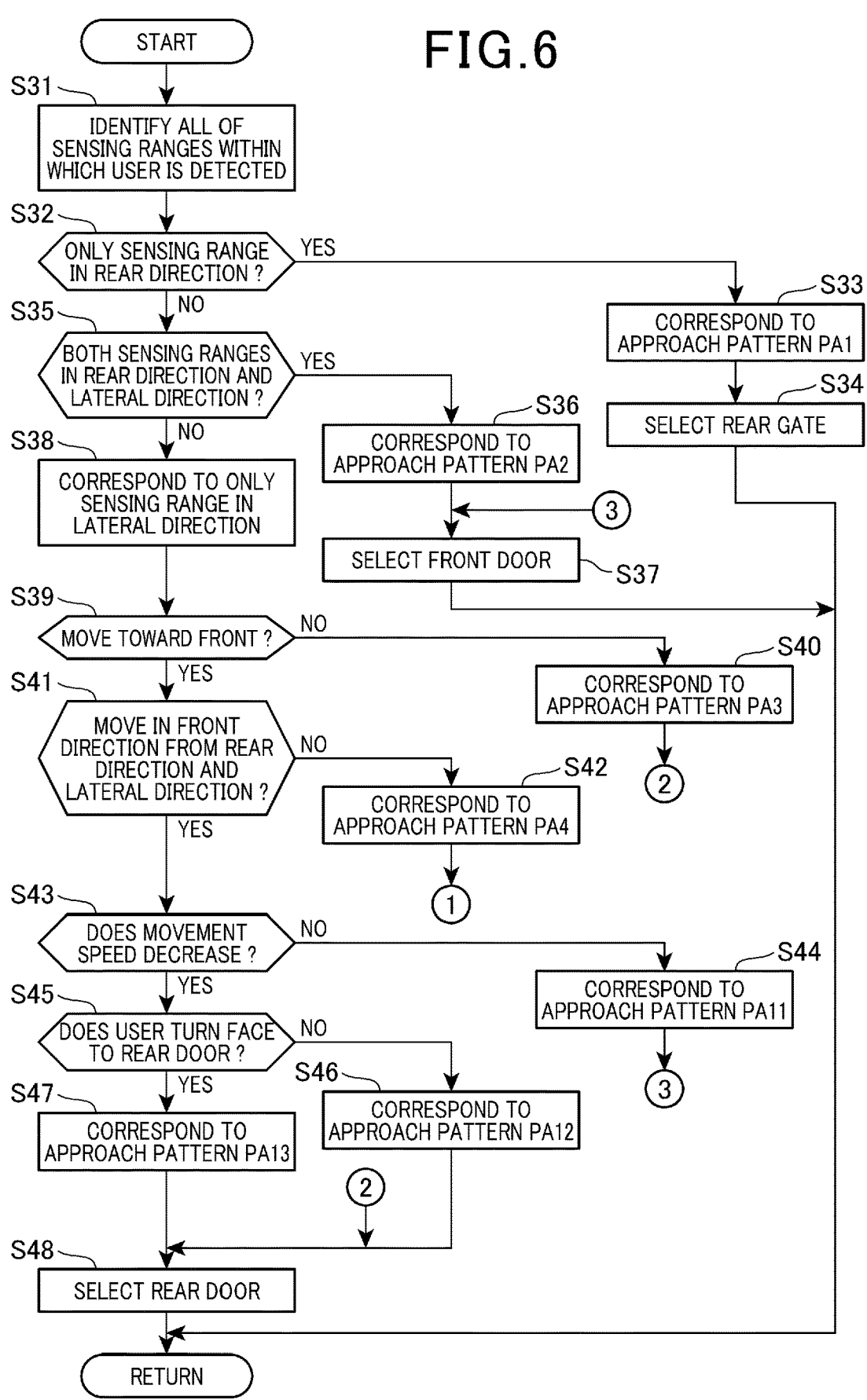
FIG. 6 is a flowchart illustrating an operation of the vehicle control apparatus.

Each of FIGS. 5 and 6 is a flowchart illustrating an operation of the vehicle control apparatus 100.

In FIG. 5, the approach detection section 111 executes steps S11 to S12 and the function control section 114 executes steps S13 to S14. The authentication section 112 executes steps S15 to S20, the determination section 115 executes step S21, and the door operation control section 113 executes step S22.

The vehicle control apparatus 100 determines whether or not the sensing apparatus 41 senses the person P by obtaining a result of sensing by the sensing apparatus 41 (step S11). When the sensing apparatus 41 does not sense the person P (step S11; NO), the vehicle control apparatus 100 repeatedly executes step S11 in a predetermined time cycle. When the sensing apparatus 41 senses the person P (step S11; YES), the vehicle control apparatus 100 detects the presence of the person P within the sensing range 51 (step S12).

The vehicle control apparatus 100 determines whether or not the person P detected within the sensing range 51 approaches a position within the distance R2 from the sensing apparatus 41 (step S13). The vehicle control apparatus 100 stands by in step S13 until the person P approaches the position within the distance R2 (step S13; NO).

When the person P approaches the position within the distance R2 from the sensing apparatus 41 (step S13; YES), the vehicle control apparatus 100 starts the camera 42 (step S14). In step S14, the vehicle control apparatus 100 starts the camera 42 corresponding to the sensing apparatus 41 that detects the person P in step S13. For example, when the person P approaches the position within the distance R2 from the sensing apparatus 41a, the vehicle control apparatus 100 starts the camera 42a in step S14. Alternatively, the vehicle control apparatus 100 may start all of the cameras 42 included in the vehicle 1 in step S14.

The vehicle control apparatus 100 authenticates the person P in steps S15 to S19. Steps S15 to S19 correspond to tentative authentication performed once. The vehicle control apparatus 100 obtains an image captured by the camera 42 in step S15 (step S15). In step S15, the vehicle control apparatus 100 obtains one still image or one captured image including one frame as described above. The vehicle control apparatus 100 extracts a face region from the obtained captured image (step S16). The vehicle control apparatus 100 calculates a feature value of the face region (step S17) and performs authentication on the basis of the calculated feature value (step S18). In step S18, for example, as described above, the matching score is calculated between the feature value calculated from the face region and a feature value stored in the face feature value DB 123 and the calculated matching score is compared with the determination threshold.

The vehicle control apparatus 100 determines whether or not the authentication is established (step S19). For example, when the matching score is higher than or equal to the determination threshold, the vehicle control apparatus 100 determines that the authentication is established. When the authentication is not established (step S19; NO), the vehicle control apparatus 100 returns to step S15.

When the authentication is established (step S19; YES), the vehicle control apparatus 100 determines whether or not authentication is established an authentication criterion number of times or more (step S20). In step S20, the vehicle control apparatus 100 may determine whether or not authentication is established an authentication criterion number of times or more in a row. When authentication is not established an authentication criterion number of times or more (step S20; NO), the vehicle control apparatus 100 returns to step S15. When authentication is established an authentication criterion number of times or more (step S20; YES), the vehicle control apparatus 100 transitions to step S21.

In step S21, the vehicle control apparatus 100 executes determination processing (step S21). The determination processing is processing of determining whether or not a moving path of the person P corresponds to an approach pattern set in advance. The details of the determination processing will be illustrated in FIG. 6.

FIG. 6 is a flowchart illustrating the determination processing of step S21 in detail and steps S31 to S48 are executed by the determination section 115. The person P has been already authenticated as a user in step S31 and subsequent steps and the person P will be thus described as a user in the following description.

The vehicle control apparatus 100 identifies all of the sensing ranges 51 within which the user is detected (step S31). For example, when the user is detected within the sensing range 51c and the sensing range 51a while moving, the sensing range 51c and the sensing range 51a are identified in step S31.

The vehicle control apparatus 100 determines whether or not the sensing range 51 identified in step S31 includes only the sensing range 51 in the rear direction (step S32). The sensing range 51 in the rear direction is the sensing range 51c including the area in the rear direction of the vehicle 1 in FIG. 4. When it is determined that only the sensing range 51 in the rear direction is included (step S32; YES), the vehicle control apparatus 100 determines that the moving path of the user corresponds to the approach pattern PA1 (step S33). In this case, the vehicle control apparatus 100 selects the rear gate 15 as an openable and closeable unit to be brought into operation (step S34) and transitions to step S22 in FIG. 5.

When the vehicle control apparatus 100 determines that the sensing range 51 identified in step S31 does not include only the sensing range 51 in the rear direction (step S32; NO), the vehicle control apparatus 100 determines whether or not the sensing ranges 51 in the rear direction and the lateral direction are both included (step S35). The sensing ranges 51 in the lateral direction are the sensing range 51a and the sensing range 51b including the areas in the lateral direction of the vehicle 1. When it is determined that the sensing range 51 identified in step S31 includes any of the sensing range 51a and the sensing range 51b, and the sensing range 51c (step S35; YES), the vehicle control apparatus 100 determines that the moving path of the user corresponds to the approach pattern PA2 (step S36). In this case, the vehicle control apparatus 100 selects the front door 11 or the front door 12 as an openable and closeable unit to be brought into operation (step S37) and transitions to step S22 in FIG. 5. In step S37, the vehicle control apparatus 100 selects the door on the side corresponding to the sensing range 51 identified in step S31 from the front door 11 and the front door 12. The vehicle control apparatus 100 selects the front door 11 on the driver's seat 21 side in step S37 when the sensing range 51a is identified in step S31, and selects the front door 12 in step S37 when the sensing range 51b is identified in step S31.

When the vehicle control apparatus 100 determines that the sensing range 51 identified in step S31 does not include both of the sensing ranges 51 in the rear direction and the lateral direction (step S35; NO), the vehicle control apparatus 100 determines that only the sensing range 51 in the lateral direction is included (step S38). That is, the sensing range 51 within which the user is sensed includes only the sensing range 51a or the sensing range 51b. In this case, the vehicle control apparatus 100 obtains the movement direction of the user within the sensing range 51a or the sensing range 51b and determines whether or not the user moves toward the front (step S39). Here, the front refers to the front of the vehicle 1.

When the vehicle control apparatus 100 determines that the user does not move toward the front (step S39; NO), the vehicle control apparatus 100 determines that the moving path of the user corresponds to the approach pattern PA3 (step S40). In this case, the vehicle control apparatus 100 transitions to step S48 described below.

When the vehicle control apparatus 100 determines that the user moves toward the front (step S39; YES), the vehicle control apparatus 100 obtains the trajectory of the movement of the user and determines whether or not the user moves in the front direction of the vehicle 1 from the rear direction and the lateral direction (step S41). The rear direction and the lateral direction of the vehicle 1 correspond, for example, to the position of the starting point of the approach pattern PA10 illustrated in FIG. 4. That is, it is a pattern in which the user diagonally approaches the vehicle 1.

When the vehicle control apparatus 100 determines that the user does not move in the front direction of the vehicle 1 from the rear direction and the lateral direction (step S41; NO), the vehicle control apparatus 100 determines that the moving path of the user corresponds to the movement pattern PA4 (step S42). In this case, the vehicle control apparatus 100 ends this processing in FIGS. 5 and 6 without bringing the openable and closeable units of the vehicle 1 into operation.

When the vehicle control apparatus 100 determines that the user moves in the front direction of the vehicle 1 from the rear direction and the lateral direction (step S41; YES), the vehicle control apparatus 100 transitions to step S43 and makes a detailed determination as to the approach pattern PA10. That is, the vehicle control apparatus 100 obtains the movement speed of the user within the sensing range 51*a* or the sensing range 51*b* and determines whether or not the movement speed decreases (step S43). In step S43, the vehicle control apparatus 100 may determine whether or not the movement speed of the user decreases as the user approaches the vehicle 1. In this case, the vehicle control apparatus 100 makes a determination by obtaining the relationship between the position of the user and the movement speed of the user within the sensing range 51*a* or the sensing range 51*b*.

When the vehicle control apparatus 100 determines that the movement speed of the user does not decrease (step S43; NO), the vehicle control apparatus 100 determines that the moving path of the user corresponds to the approach pattern PA11 (step S44). In this case, the vehicle control apparatus 100 transitions to step S37, selects any of the front door 11 and the front door 12 as an openable and closeable unit, and transitions to step S22 in FIG. 5.

When the vehicle control apparatus 100 determines that the movement speed of the user decreases (step S43; YES), the vehicle control apparatus 100 determines whether or not the user turns the face to the rear door 13 or the rear door 14 (step S45). The determination in step S45 is made, for example, by the determination section 115 analyzing an image captured by the camera 42.

When the vehicle control apparatus 100 determines that the user does not turn the face to the rear door 13 or the rear door 14 (step S45; NO), the vehicle control apparatus 100 determines that the moving path of the user corresponds to the approach pattern PA12 (step S46). In this case, the vehicle control apparatus 100 transitions to step S48 described below.

When the vehicle control apparatus 100 determines that the user turns the face to the rear door 13 or the rear door 14 (step S45; YES), the vehicle control apparatus 100 determines that the moving path of the user corresponds to the approach pattern PA13 (step S47) and transitions to step S48. In step S48, the vehicle control apparatus 100 selects any of the rear door 13 and the rear door 14 as an openable and closeable unit and transitions to step S22 in FIG. 5.

In step S22 in FIG. 5, the vehicle control apparatus 100 brings a unit into operation that moves the openable and closeable unit selected by the determination section 115 from the door operation units 31, 32, 33, 34, and 35 (step S22). This releases the door lock of any of the front doors 11 and 12, the rear doors 13 and 14, and the rear gate 15 or performs an opening operation on any of the front doors 11 and 12, the rear doors 13 and 14, and the rear gate 15.

4. Other Embodiments

In the embodiment described above, the sensing range 51 and the authentication range 52 are illustrated as fan-shaped ranges that have overlapping centers, but this is an example. The shapes and sizes of the sensing range 51 and the authentication range 52 are not limited to the example illustrated in FIG. 1. In addition, the authentication range 52 does not have to be inside the sensing range 51. In addition, in the embodiment described above, the configuration has been exemplified in which the vehicle 1 includes the three detection units 40*a*, 40*b*, and 40*c* corresponding to the areas in the rear direction and the lateral direction of the vehicle 1, but this is an example. A larger number of detection units may be provided to the vehicle 1. For example, the vehicle 1 may be provided with a detection unit that has the sensing range 51 and the authentication range 52 including the area in the front direction of the vehicle 1. This detection unit may be, for example, a camera or a sensor used for the advanced driver-assistance systems (ADAS) of the vehicle 1, or a camera or a sensor used for a security apparatus of the vehicle 1. In addition, the example has been described in which each of the detection units 40*a* and 40*b* is buried and installed in the outer surface of the center pillar of the vehicle 1 between the front door 11 and the rear door 13, but this is an example. For example, one or both of the detection unit 40*a* and the detection unit 40*b* may be installed on the roof of the vehicle 1. In addition, for example, one or both of the detection unit 40*a* and the detection unit 40*b* may be buried and installed at positions overlapping with the pillar or positions overlapping with the area near the pillar on the outer surfaces of the front door 11 and the rear door 13.

The operation for authentication described in the embodiment above is an example. For example, the authentication section 112 may perform authentication processing by using images captured by the plurality of cameras 42 among the cameras 42*a*, 42*b*, and 42*c* included in the vehicle 1. Needless to say, it is possible to adopt authentication processing compliant with another method.

FIG. 3 is a schematic diagram in which the configuration of the vehicle control apparatus 100 is divided in accordance with the chief processing contents to facilitate the understandings of the invention according to the present application, but the vehicle control apparatus 100 may be configured in accordance with other division. In addition, the processing of each of the components may be executed by one hardware unit or executed by a plurality of hardware units. The processing illustrated in each of FIGS. 5 and 6 may be executed by one program or executed by a plurality of programs. In addition, the vehicle control apparatus 100 may include one ECU or functions of the vehicle control apparatus 100 may be executed by a plurality of ECUs.

The processing units of the flowchart illustrated in each of FIGS. 5 and 6 result from division compliant with the chief processing contents to facilitate the understandings of the processing by the vehicle control apparatus 100, but the present invention is not limited by the way of the division or the name of the processing units. It is also possible to further divide this processing into more processing units in accordance with the processing contents or further divide this processing to cause one processing unit to include more processing. In addition, the processing order of any of the flowcharts described above is not also limited to the illustrated example.

In the embodiment described above, the vehicle control apparatus according to the present invention is configured by the execution of the control program 121 by the processor

110 of the vehicle control apparatus 100 included in the vehicle 1 and the processor 110 executes the vehicle control method. As another embodiment, the vehicle control apparatus may be configured on a server that communicates with the vehicle 1 by the execution of a vehicle control program by a computer included in the server and the computer may execute the vehicle control method. In this case, a user who approaches the vehicle 1 is authenticated on the basis of a captured image of the area around the vehicle 1 that is transmitted from the vehicle 1 to the server and the user is permitted entry to the vehicle 1.

The control program 121 that is executed by the processor 110 according to the present embodiment is not only configured to be stored in the memory 120, but is also implementable as stored in a non-transitory computer-readable storage medium. As the non-transitory computer-readable storage medium, for example, a magnetic storage apparatus, a magnetic recording medium, an optical recording medium, or a semiconductor memory device is usable. Specifically, portable or stationary recording media such as a flexible disk, a hard disk drive (HDD), a CD-ROM, a DVD, a magneto-optical disk, a flash memory, and a card-shaped recording medium are included. The non-transitory computer-readable storage medium may be a non-volatile storage apparatus such as a RAM, a ROM, or an HDD that is an internal storage apparatus included in a computer including the vehicle control apparatus 100.

5. Configurations Supported by Embodiments Above

The embodiments described above are specific examples of the following configurations.

(Configuration 1) A vehicle control apparatus including: an approach detection section configured to detect a person within a first detection range and a second detection range, the first detection range including an area in a rear direction of a vehicle, the second detection range corresponding to a side surface of the vehicle on which an openable and closeable object is provided; a determination section configured to determine whether or not a motion of a person detected by the approach detection section corresponds to an approach pattern in which the openable and closeable object is approached; and an openable and closeable object operation control section configured to bring an openable and closeable object operation unit into operation when the determination section determines that the motion corresponds to the approach pattern, the openable and closeable object operation unit at least releasing a lock of the openable and closeable object or performing an opening operation of opening the openable and closeable object, in which, when a person who is not detected within the first detection range is detected within the second detection range by the approach detection section, the determination section determines that the motion corresponds to the approach pattern.

When a motion of a person detected around a vehicle corresponds to a pattern in which the vehicle is approached, the vehicle control apparatus according to Configuration 1 releases a lock of an openable and closeable unit of the vehicle or performs an opening operation on the openable and closeable unit of the vehicle. This makes it possible to implement control to bring the openable and closeable object of the vehicle into operation when a user comes closer to the vehicle even without any specific apparatus. It is thus possible to make the control to bring the openable and closeable object of the vehicle into operation more casually available when the user comes closer to the vehicle and eventually contribute to the development of a sustainable transportation system.

(Configuration 2) The vehicle control apparatus according to Configuration 1, in which the approach detection section performs detection by using a first sensing apparatus and a second sensing apparatus, the first sensing apparatus sensing a person within the first detection range, the second sensing apparatus sensing a person within the second detection range, and the determination section determines whether or not the motion of the person detected by the approach detection section corresponds to the approach pattern by using results of sensing by the first sensing apparatus and the second sensing apparatus.

The vehicle control apparatus according to Configuration 2 makes it possible to use a sensing apparatus that senses a person around a vehicle to quickly determine whether or not a motion of the detected person corresponds to a pattern in which the vehicle is approached.

(Configuration 3) The vehicle control apparatus according to Configuration 1 or 2, in which, when the determination section determines that the motion corresponds to the approach pattern, the openable and closeable object operation control section brings the openable and closeable object operation unit into operation, the openable and closeable object operation unit corresponding to at least any of the openable and closeable object provided on a surface of the vehicle on a driver's seat side and the openable and closeable object provided on a surface of the vehicle on a passenger seat side.

The vehicle control apparatus according to Configuration 3 makes it possible to increase easiness of climbing up and down by opening an openable and closeable unit on a driver's seat side or a passenger seat side of a vehicle when a person detected around the vehicle approaches the vehicle.

(Configuration 4) The vehicle control apparatus according to any one of Configurations 1 to 3, in which, when a person detected within the second detection range moves toward a front of the vehicle from a position closer to a rear of the vehicle in a lateral direction of the vehicle, the determination section determines that the motion corresponds to a first approach pattern, and when the determination section determines that the motion corresponds to the first approach pattern, the openable and closeable object operation control section brings the openable and closeable object operation unit into operation, the openable and closeable object operation unit corresponding to the openable and closeable object provided on a front side surface of the vehicle.

The vehicle control apparatus according to Configuration 4 makes it possible to bring, when a person detected around a vehicle moves toward an openable and closeable object provided in a front of the vehicle, an openable and closeable object into operation in accordance with this movement and increase easiness of climbing up and down.

(Configuration 5) The vehicle control apparatus according to any one of Configurations 1 to 4, in which, when a person detected within the second detection range moves toward a front of the vehicle from a position closer to a rear of the vehicle in a lateral direction of the vehicle and movement speed of the person detected within the second detection range decreases, the determination section determines that the motion corresponds to a second approach pattern, and when the determination section determines that the motion corresponds to the second approach pattern, the openable and closeable object operation control section brings the openable and closeable object operation unit into operation, the openable and closeable object operation unit corresponding to the openable and closeable object provided on a rear side surface of the vehicle.

The vehicle control apparatus according to Configuration 5 detects that a person detected around a vehicle moves toward a rear side surface of the vehicle on the basis of a change in movement speed of the person and brings an openable and closeable object into operation in accordance with this movement. This makes it possible to increase easiness of climbing up and down.

(Configuration 6) The vehicle control apparatus according to any one of Configurations 1 to 5, in which, when a person detected within the second detection range moves toward a front of the vehicle from a position closer to a rear of the vehicle in a lateral direction of the vehicle, movement speed of the person detected within the second detection range decreases, and the person detected within the second detection range turns a face to the openable and closeable object provided in the rear of the vehicle, the determination section determines that the motion corresponds to a third approach pattern, and when the determination section determines that the motion corresponds to the third approach pattern, the openable and closeable object operation control section causes the openable and closeable object operation unit to execute the opening operation, the openable and closeable object operation unit corresponding to the openable and closeable object provided on a rear side surface of the vehicle.

The vehicle control apparatus according to Configuration 6 brings an openable and closeable object in a rear of the vehicle into operation when a person detected around a vehicle turns a face to the openable and closeable object. This makes it possible to increase the easiness of climbing up and down.

(Configuration 7) The vehicle control apparatus according to any one of Configurations 1 to 6, in which, when a person detected within the second detection range moves in a direction different from a direction toward a front of the vehicle, the determination section determines that the motion corresponds to a fourth approach pattern, and when the determination section determines that the motion corresponds to the fourth approach pattern, the openable and closeable object operation control section brings the openable and closeable object operation unit into operation, the openable and closeable object operation unit corresponding to the openable and closeable object provided on a rear side surface of the vehicle.

The vehicle control apparatus according to Configuration 7 detects that a person detected around a vehicle moves toward a rear side surface of the vehicle and brings an openable and closeable object into operation. This makes it possible to increase the easiness of climbing up and down.

(Configuration 8) A vehicle control method that is executed by a computer, the vehicle control method including: detecting a person within a first detection range and a second detection range, the first detection range including an area in a rear direction of a vehicle, the second detection range corresponding to a side surface of the vehicle on which an openable and closeable object is provided; determining whether or not a motion of a detected person corresponds to an approach pattern in which the openable and closeable object is approached and determining that the motion corresponds to the approach pattern when a person who is not detected within the first detection range is detected within the second detection range; and bringing an openable and closeable object operation unit into operation when determining that the motion corresponds to the approach pattern, the openable and closeable object operation unit at least releasing a lock of the openable and closeable object or performing an opening operation of opening the openable and closeable object.

When a motion of a person detected around a vehicle corresponds to a pattern in which the vehicle is approached, the vehicle control method according to Configuration 8 releases a lock of an openable and closeable unit of the vehicle or performs an opening operation on the openable and closeable unit of the vehicle. This makes it possible to implement control to bring the openable and closeable object of the vehicle into operation when a user comes closer to the vehicle even without any specific apparatus. It is thus possible to make the control to bring the openable and closeable object of the vehicle into operation more casually available when the user comes closer to the vehicle and eventually contribute to the development of a sustainable transportation system.

(Configuration 9) A non-transitory computer-readable storage medium storing a program that is executable by a computer, the program causing the computer to function as: an approach detection section configured to detect a person within a first detection range and a second detection range, the first detection range including an area in a rear direction of a vehicle, the second detection range corresponding to a side surface of the vehicle on which an openable and closeable object is provided; a determination section configured to determine whether or not a motion of a person detected by the approach detection section corresponds to an approach pattern in which the openable and closeable object is approached and determine that the motion corresponds to the approach pattern when a person who is not detected within the first detection range is detected within the second detection range by the approach detection section; and an openable and closeable object operation control section configured to bring an openable and closeable object operation unit into operation when the determination section determines that the motion corresponds to the approach pattern, the openable and closeable object operation unit at least releasing a lock of the openable and closeable object or performing an opening operation of opening the openable and closeable object.

When a motion of a person detected around a vehicle corresponds to a pattern in which the vehicle is approached, the program according to Configuration 9 releases a lock of an openable and closeable unit of the vehicle or performs an opening operation on the openable and closeable unit of the vehicle. This makes it possible to implement control to bring the openable and closeable object of the vehicle into operation when a user comes closer to the vehicle even without any specific apparatus. It is thus possible to make the control to bring the openable and closeable object of the vehicle into operation more casually available when the user comes closer to the vehicle and eventually contribute to the development of a sustainable transportation system.

REFERENCE SIGNS LIST 1 vehicle
2 terminal apparatus
11, 12 front door (openable and closeable object)
11a, 12a, 13a, 14a, 15a door handle
11b, 12b, 13b, 14b, 15b door handle sensor
13, 14 rear door (openable and closeable object)
15 rear gate (openable and closeable object)
21 driver's seat
22 passenger seat
23 back seat
29 communication apparatus
31, 32, 33, 34, 35 door operation unit (openable and closeable object operation unit)
31a door lock apparatus
31b opening and closing apparatus
40a, 40b, 40c detection unit
41 sensing apparatus
41a sensing apparatus (second sensing apparatus)
41b sensing apparatus (second sensing apparatus)
41c sensing apparatus (first sensing apparatus)
42, 42a, 42b, 42c camera (image capturing unit)
43, 43a, 43b, 43c notification apparatus
51 sensing range
51a sensing range (second detection range)
51b sensing range (second detection range)
51c sensing range (first detection range)
52, 52a, 52b, 52c authentication range
100 vehicle control apparatus
110 processor
111 approach detection section
112 authentication section
113 door operation control section (openable and closeable object operation control section)
114 function control section
120 memory
121 control program
122 setting data
123 face feature value DB

What is claimed is:

1. A vehicle control apparatus comprising a processor that is configured to:

detect a person within a first detection range using a first sensing apparatus and a second detection range using a second sensing apparatus, the first and second detection ranges being detection ranges which are different from each other, the first detection range including an area in a rear direction of a vehicle, the second detection range corresponding to a side surface of the vehicle on which an openable and closeable object is provided, and each of the first sensing apparatus and the second sensing apparatus is a passive infrared ray sensor, a camera, or a radar;

perform authentication as to whether or not the person detected is a user of the vehicle, the user of the vehicle being registered in advance;

determine whether or not a motion of the person detected corresponds to an approach pattern in which the openable and closeable object is approached; and bring an openable and closeable object operation unit into operation when determining that the motion corresponds to the approach pattern, the openable and closeable object operation unit at least releasing a lock of the openable and closeable object or performing an opening operation of opening the openable and closeable object, wherein the processor identifies all of the detection ranges within which the person is detected by using results of sensing by the first sensing apparatus and the second sensing apparatus, the processor determines whether or not the detection range identified includes only the first detection range in the rear direction, when a person who is not detected within the first detection range is detected within the second detection range, the processor determines that the motion corresponds to the approach pattern.

2. The vehicle control apparatus according to claim 1, wherein, when the processor determines that the motion corresponds to the approach pattern, the processor brings the openable and closeable object operation unit into operation, the openable and closeable object operation unit corresponding to at least any of the openable and closeable object provided on a surface of the vehicle on a driver's seat side and the openable and closeable object provided on a surface of the vehicle on a passenger seat side.

3. The vehicle control apparatus according to claim 1, wherein when a person detected within the second detection range moves toward a front of the vehicle from a position closer to a rear of the vehicle in a lateral direction of the vehicle, the processor determines that the motion corresponds to a first approach pattern, and when determining that the motion corresponds to the first approach pattern, the processor brings the openable and closeable object operation unit into operation, the openable and closeable object operation unit corresponding to the openable and closeable object provided on a front side surface of the vehicle.

4. The vehicle control apparatus according to claim 1, wherein when a person detected within the second detection range moves toward a front of the vehicle from a position closer to a rear of the vehicle in a lateral direction of the vehicle and movement speed of the person detected within the second detection range decreases, the processor determines that the motion corresponds to a second approach pattern, and when determining that the motion corresponds to the second approach pattern, the processor brings the openable and closeable object operation unit into operation, the openable and closeable object operation unit corresponding to the openable and closeable object provided on a rear side surface of the vehicle.

5. The vehicle control apparatus according to claim 1, wherein when a person detected within the second detection range moves toward a front of the vehicle from a position closer to a rear of the vehicle in a lateral direction of the vehicle, movement speed of the person detected within the second detection range decreases, and the person detected within the second detection range turns a face to the openable and closeable object provided in the rear of the vehicle, the processor determines that the motion corresponds to a third approach pattern, and when the processor determines that the motion corresponds to the third approach pattern, the processor causes the openable and closeable object operation unit to execute the opening operation, the openable and closeable object operation unit corresponding to the openable and closeable object provided on a rear side surface of the vehicle.

6. The vehicle control apparatus according to claim 1, wherein when a person detected within the second detection range moves in a direction different from a direction toward a front of the vehicle, the processor determines that the motion corresponds to a fourth approach pattern, and when the processor determines that the motion corresponds to the fourth approach pattern, the processor brings the openable and closeable object operation unit into operation, the openable and closeable object operation unit corresponding to the openable and closeable object provided on a rear side surface of the vehicle.

7. A vehicle control method that is executed by a computer, the vehicle control method comprising:

detecting a person within a first detection range using a first sensing apparatus and a second detection range using a second sensing apparatus, the first and second detection ranges being detection ranges and which are different from each other, the first detection range including an area in a rear direction of a vehicle, the second detection range corresponding to a side surface of the vehicle on which an openable and closeable object is provided, and each of the first sensing apparatus and the second sensing apparatus is a passive infrared ray sensor, a camera, or a radar;

performing authentication as to whether or not the person detected is a user of the vehicle, the user being registered in advance;

identifying all of the detection ranges within which the person is detected by using results of sensing by the first sensing apparatus and the second sensing apparatus;

determining whether or not the detection range identified includes only the first detection range in the rear direction;

determining whether or not a motion of the detected person corresponds to an approach pattern in which the openable and closeable object is approached and determining that the motion corresponds to the approach pattern when a person who is not detected within the first detection range is detected within the second detection range; and bringing an openable and closeable object operation unit into operation when determining that the motion corresponds to the approach pattern, the openable and closeable object operation unit at least releasing a lock of the openable and closeable object or performing an opening operation of opening the openable and closeable object.

8. A non-transitory computer-readable storage medium storing a program that is executable by a computer, the program causing the computer to:

detect a person within a first detection range using a first sensing apparatus and a second detection range using a second sensing apparatus, the first and second detection ranges being detection ranges which are different from each other, the first detection range including an area in a rear direction of a vehicle, the second detection range corresponding to a side surface of the vehicle on which an openable and closeable object is provided, and each of the first sensing apparatus and the second sensing apparatus is a passive infrared ray sensor, a camera, or a radar;

perform authentication as to whether or not the person detected is a user of the vehicle, the user being registered in advance;

identify all of the detection ranges within which the person is detected by using the results of sensing by the first sensing apparatus and the second sensing apparatus;

determine whether or not the detection range identified includes only the first detection range in the rear direction;

determine whether or not a motion of the person detected corresponds to an approach pattern in which the openable and closeable object is approached and determine that the motion corresponds to the approach pattern when a person who is not detected within the first detection range is detected within the second detection range; and bring an openable and closeable object operation unit into operation when determining that the motion corresponds to the approach pattern, the openable and closeable object operation unit at least releasing a lock of the openable and closeable object or performing an opening operation of opening the openable and closeable object.

9. The vehicle control apparatus according to claim 3, wherein when a person detected within the second detection range moves toward a front of the vehicle from a position closer to a rear of the vehicle in a lateral direction of the vehicle and movement speed of the person detected within the second detection range decreases, the processor determines that the motion corresponds to a second approach pattern, and when determining that the motion corresponds to the second approach pattern, the processor brings the openable and closeable object operation unit into operation, the openable and closeable object operation unit corresponding to the openable and closeable object provided on a rear side surface of the vehicle.

10. The vehicle control apparatus according to claim 1, wherein when determining the detection range identified includes only the first detection range in the rear direction, the processor brings the openable and closeable object operation unit into operation, the openable and closeable object operation unit corresponding to the openable and closeable object provided on a rear end of the vehicle.

11. A vehicle control apparatus comprising a processor that is configured:

an approach detection section configured to detect a person within a first detection range and a second detection range which are as detection ranges and which are different from each other, the first detection range including an area in a rear direction of a vehicle, the second detection range corresponding to a side surface of the vehicle on which an openable and closeable object is provided;

to perform authentication as to whether or not a person detected is a user of the vehicle, the user being registered in advance;

a determination section configured to determine whether or not a motion of the a person detected by the approach detection section corresponds to an approach pattern in which the openable and closeable object is approached when movement speed of the person detected (in the second detection range) decreases and when a direction of a head or a face of the person detected faces to a direction of the openable and closeable object through analysis of an image of an image sensor; and an openable and closeable object operation control section configured to bring an openable and closeable object operation unit into operation when determining the determination section determines that the motion corresponds to the approach pattern, the openable and closeable object operation unit at least releasing a lock of the openable and closeable object or performing an opening operation of opening the openable and closeable object, wherein when a person who is not detected within the first detection range is detected within the second detection range by the approach detection section, the processor determination section determines that the motion corresponds to the approach pattern.

12. A vehicle control apparatus comprising a processor that is configured:

an approach detection section configured to detect a person within a first detection range and a second detection range which are as detection ranges and which are different from each other, the first detection range including an area in a rear direction of a vehicle, the second detection range corresponding to a side surface of the vehicle on which an openable and closeable object is provided, the second detection range being in a different direction from the first detection range;

to perform authentication as to whether or not a person detected is a user of the vehicle, the user being registered in advance;

a determination section configured to determine whether or not a motion of the a person detected by the approach detection section corresponds to an approach pattern in which the openable and closeable object is approached; and an openable and closeable object operation control section configured to bring an openable and closeable object operation unit into operation when determining the determination section determines that the motion corresponds to the approach pattern, the openable and closeable object operation unit at least releasing a lock of the openable and closeable object or performing an opening operation of opening the openable and closeable object, wherein when the person is detected in the first detection range and then the person is subsequently detected in the second detection range and a movement direction of the person in the second detection range is toward a direction of the openable and closeable object a person who is not detected within the first detection range is detected within the second detection range by the approach detection section, the processor determination section determines that the motion corresponds to the approach pattern.

* * * * *